United States Patent [19]

Powers, III

[11] Patent Number: 5,551,135
[45] Date of Patent: Sep. 3, 1996

[54] METHOD OF FABRICATING A METAL PURLIN AND METHOD OF FABRICATING A BUILDING THEREWITH

[76] Inventor: John Powers, III, 4446 East Flower, Phoenix, Ariz. 85018

[21] Appl. No.: 249,283

[22] Filed: May 25, 1994

[51] Int. Cl.[6] ............................................. B21D 31/04
[52] U.S. Cl. ...................... 29/6.1; 29/897.31; 29/897.35; 52/635
[58] Field of Search .................. 29/6.1, 897.3, 29/897.31, 897.35; 52/92.2, 92.3, 262, 635

[56] References Cited

U.S. PATENT DOCUMENTS

| | | | |
|---|---|---|---|
| 828,488 | 8/1906 | Lanz | 29/897.3 |
| 3,034,197 | 5/1962 | Watanabe | 29/6.1 |
| 3,812,558 | 5/1974 | Watanabe | 29/6.1 |
| 3,861,009 | 1/1975 | Baxter | 29/6.1 |
| 4,246,737 | 1/1981 | Eiloart et al. | 29/897.31 |

*Primary Examiner*—David P. Bryant
*Attorney, Agent, or Firm*—Parsons & Associates; Don J. Flickinger; Robert A. Parsons

[57] ABSTRACT

A fabricated building including a pair of metal sidewalls positioned in an upright spaced apart relationship with a plurality of metal purlins engaged with an upper edge of one of the metal sidewalls so that the plurality of metal purlins extend between the metal sidewalls and maintain them in the upright position.

9 Claims, 7 Drawing Sheets

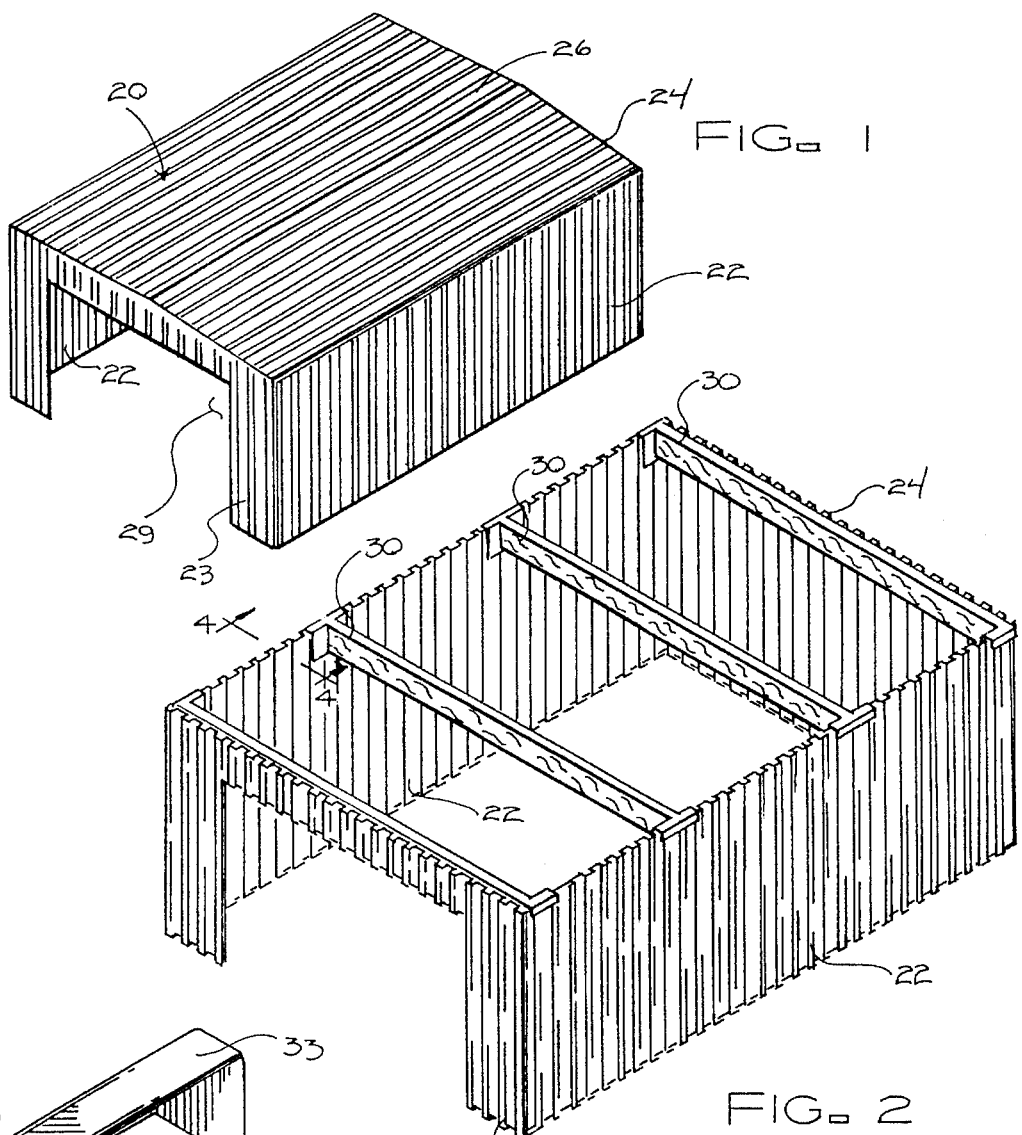
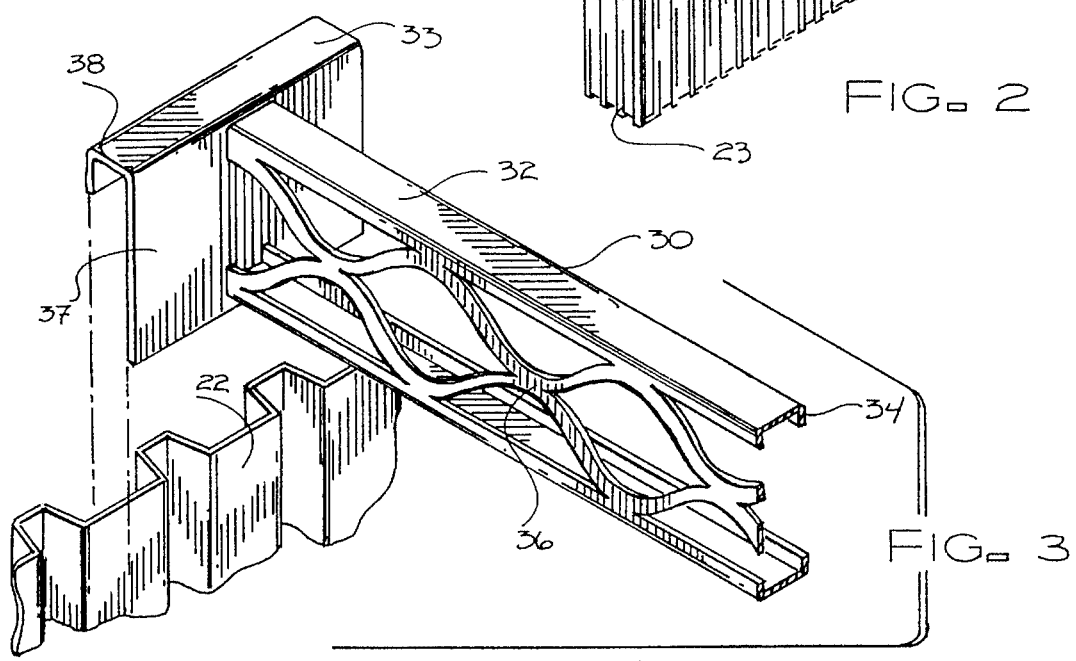

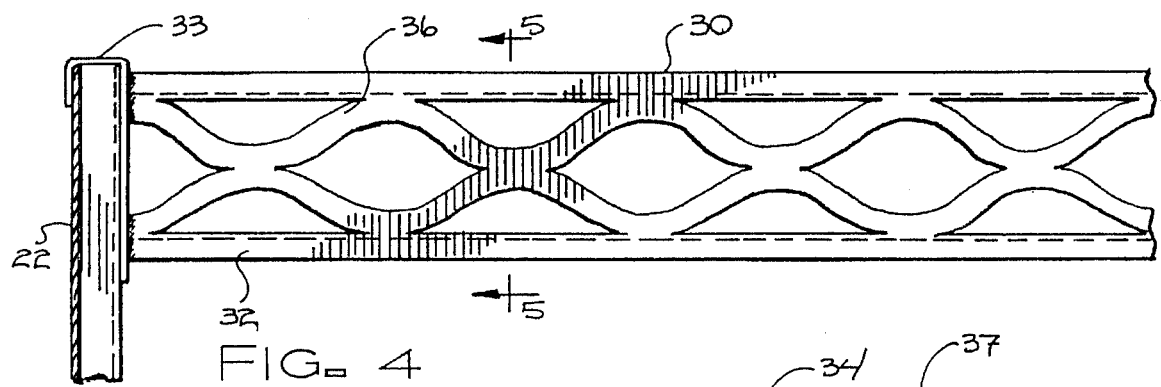
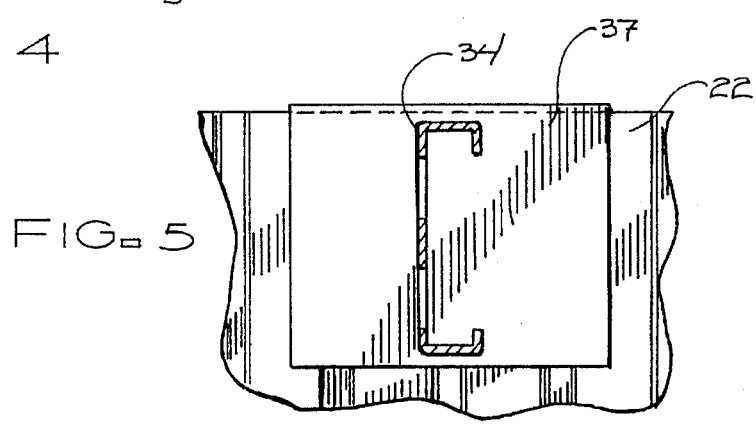
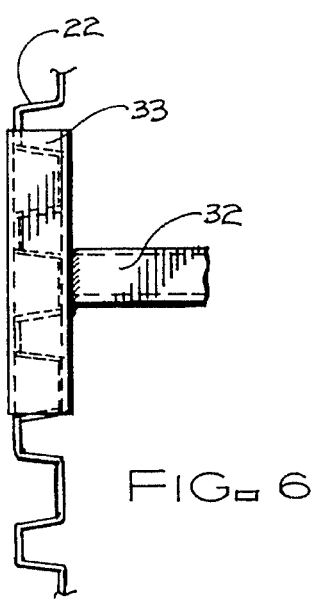
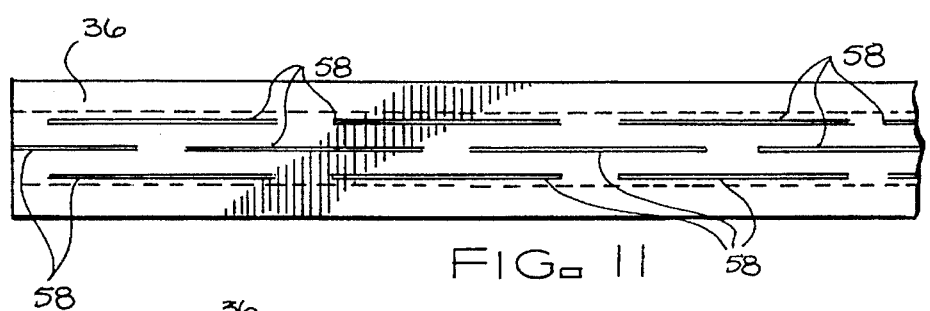
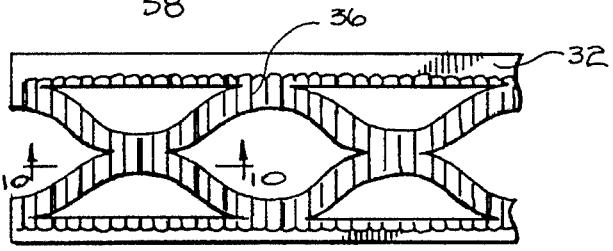
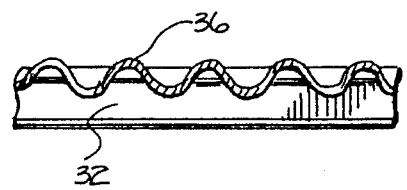

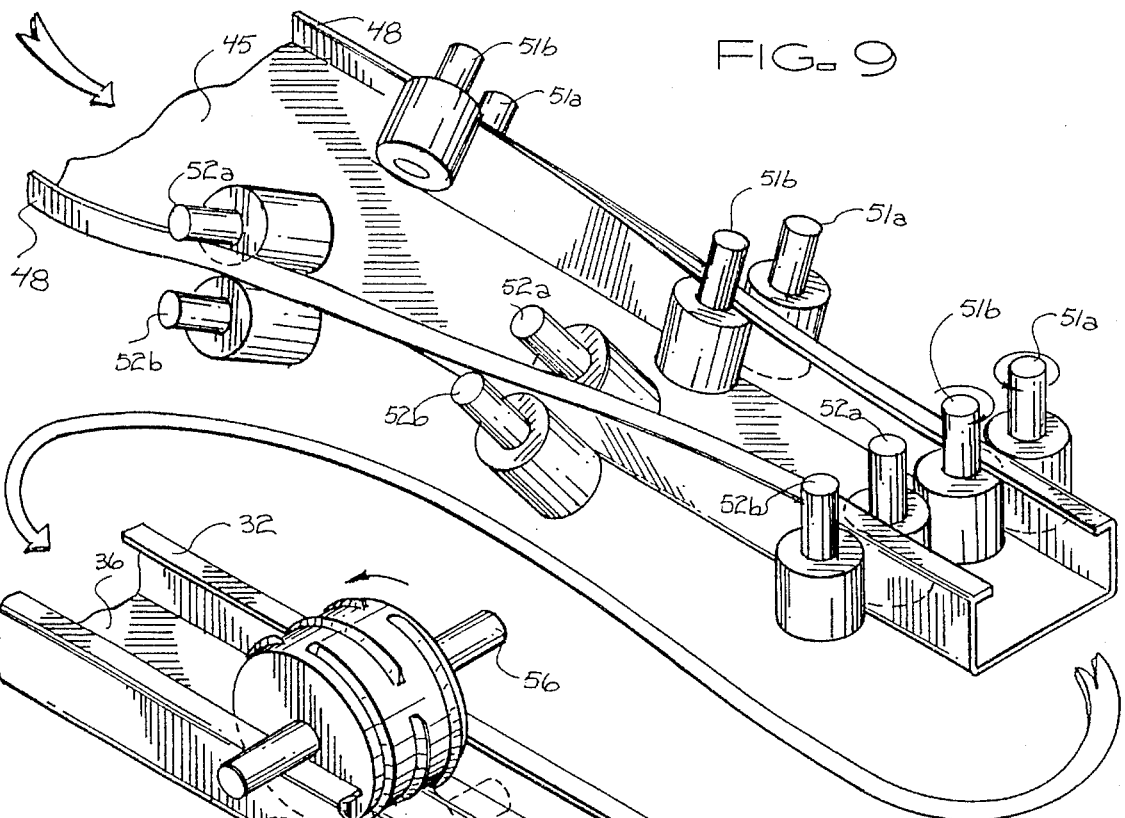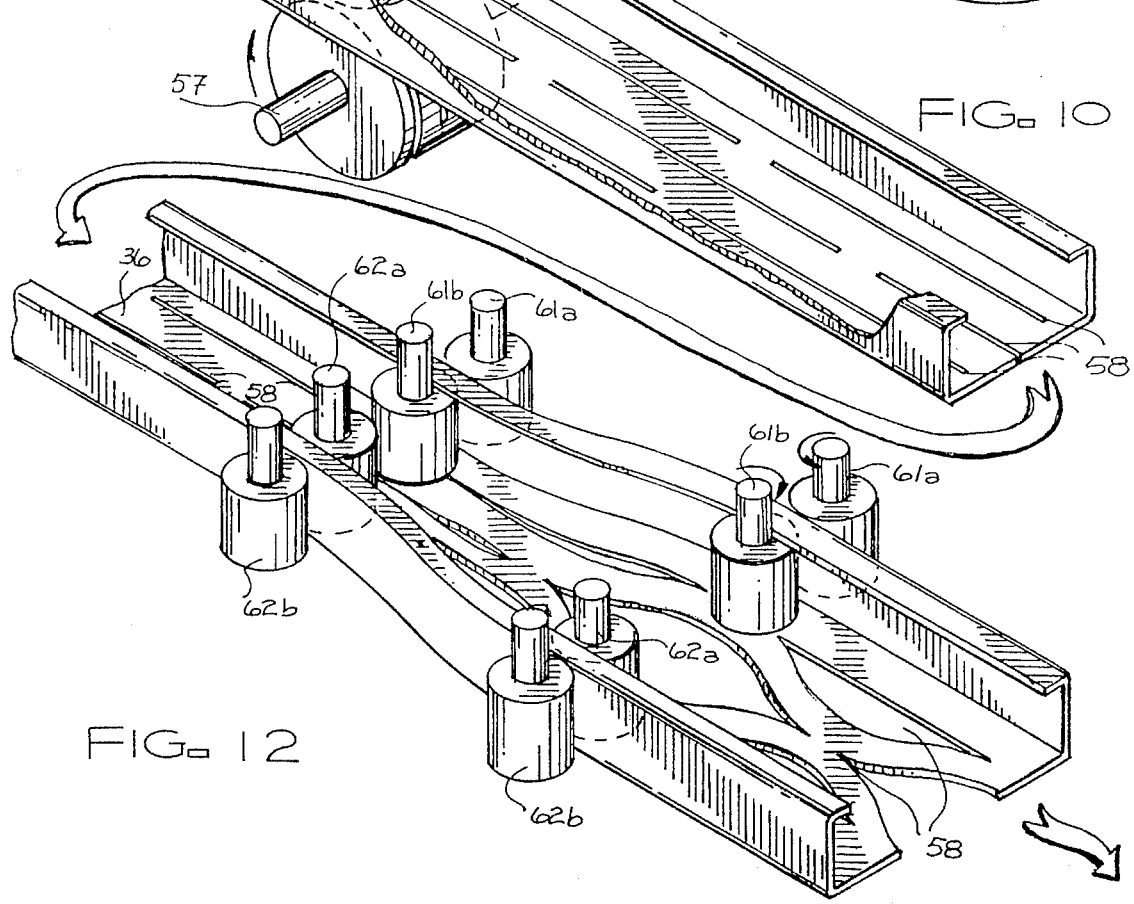

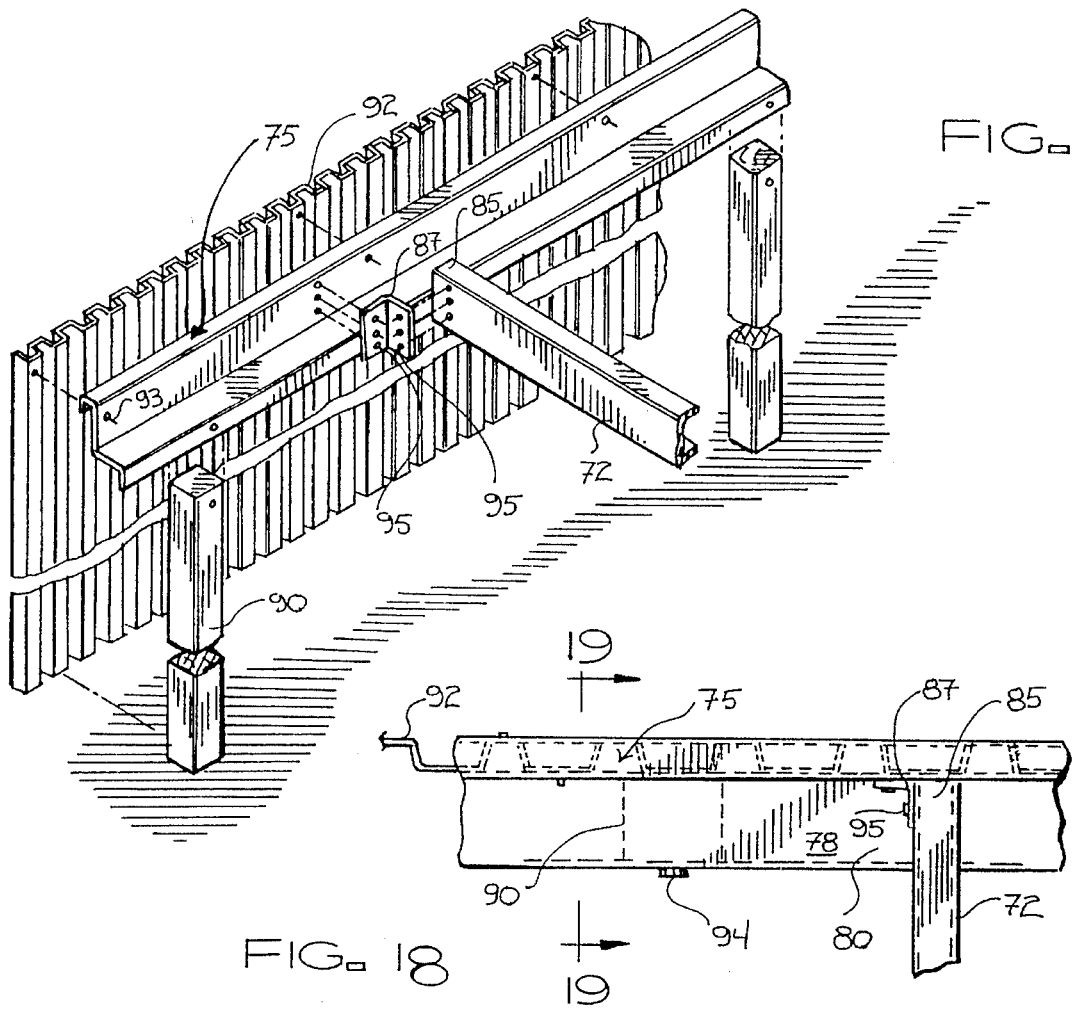
FIG. 17
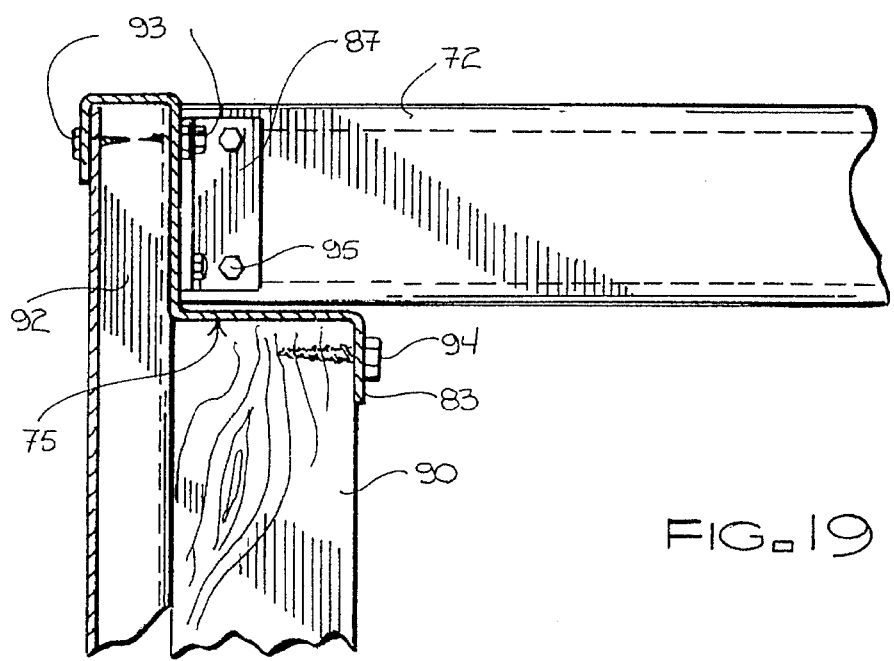
FIG. 18
FIG. 19

METHOD OF FABRICATING A METAL PURLIN AND METHOD OF FABRICATING A BUILDING THEREWITH

BACKGROUND OF THE INVENTION

1. Field of the Invention

This invention relates to fabricated buildings.

More particularly the present invention relates to fabricated buildings with metal purlins.

In a further and more specific aspect, the instant invention concerns the construction of the metal purlins to be used in the fabrication of a building.

2. Prior Art

The use of fabricated buildings for many purposes such as storage and the like, are well known. Generally, these buildings are inexpensive to purchase and easily constructed by almost anyone using a minimum amount of special tools. This type of building is usually built to be temporary, having no floor or a lightweight metal or wood base. Any internal support, therefore, is hard to manage because the walls, ceiling, and floors must be constructed to be lightweight enough for the average person to handle easily. Therefore, there is no solid foundation to which the supports may be attached. This, unfortunately, makes these buildings rather flimsy. They are frequently unable to support objects or large amounts of weight hanging on the walls or ceiling. The lack of adequate internal support in most of these cases necessitates keeping these fabricated buildings small in size.

Another type of fabricated building, which is generally well known, is ordinarily constructed to be permanent. This type of building is, usually, very stable and sturdy, supporting large amounts of weight with ease. The walls and supports are typically made of some type of heavy solid metal, reinforced concrete, or the like, and rest on a solid foundation, such as concrete. The solid structure makes these buildings heavy, as well as, complicated and extremely difficult to construct. Construction, in these cases, frequently requires the use of special tools, lifting equipment, and cement mixers or the hiring of a professional. This makes this type of fabricated building very expensive.

It would be highly advantageous, therefore, to remedy the foregoing and other deficiencies inherent in the prior art.

Accordingly, it is an object of the present invention to provide a lightweight yet sturdy fabricated building with internal support.

Another object of the invention is the provision of an easily constructed building using a minimum amount of simple tools.

And another object of the invention is to provide a building that is inexpensive to fabricate.

Still another object of this invention is the provision of a fabricated building which is inexpensive to construct.

Yet another object of the invention is to provide a more energy efficient metal purlin.

Yet still another object of the immediate invention is the provision of a sturdy metal purlin using less metal.

And a further object of the invention is to provide a metal purlin which is inexpensive to fabricate.

Still a further object of the invention is the provision of metal purlins which heavy-duty enough to easily support a fabricated building.

And still another object of the invention is to provide a fabricated building which can be either a permanent or a temporary structure of varied size.

SUMMARY OF THE INVENTION

Briefly, to achieve the desired objects of the invention in accordance with the preferred embodiments thereof, provided is a fabricated building comprised of a pair of metal sidewalls positioned in an upright spaced apart relationship with a plurality of metal purlins engaged with an upper edge of one of the metal sidewalls so that the plurality of metal purlins extend between the metal sidewalls and maintain them in the upright position.

More specifically, in a first embodiment of the invention, the metal purlin includes an elongated metal channel having a C-shaped cross-section with an expanded and corrugated web and a pair of metal hangers each having a metal plate with an inverted channel integrally formed along an upper edge thereof, the metal plate of each hanger being affixed to a separate end of the elongated metal channel with the inverted channel extending outwardly from the elongated metal channel.

In a further embodiment of the invention, a method for fabricating a metal purlin is provided. Where fabricating the metal purlin includes providing a sheet of metal and cutting the metal into elongated strips of a predetermined width. Then, rolling the edges of the strips into a channel having a generally C-shaped cross-section with a substantially flat web, then cutting a plurality of longitudinally extending and transversely spaced apart slots in the web and expanding the web of the channel by expanding the width of the slots. A pair of second sheets of metal are provided and one edge of each of the second sheets is rolled to form an inverted channel with one edge of the channel defining a vertical plate extending downwardly a distance greater than the width of the expanded web. The vertical plate of each of the inverted channels is then affixed to a separate end of the elongated metal channel.

BRIEF DESCRIPTION OF THE DRAWINGS

The foregoing and further and more specific objects and advantages of the instant invention will become readily apparent to those skilled in the art from the following detailed description of the preferred embodiment thereof taken in conjunction with the drawings in which:

FIG. 1 is a perspective view of a fabricated building constructed in accordance with the teachings of the instant invention;

FIG. 2 is a perspective view of a fabricated building, with the roof removed, illustrating a plurality of metal purlins;

FIG. 3 is an enlarged perspective view of a metal purlin of FIG. 2, portions thereof broken away;

FIG. 4 is a side elevational view as seen from line 4—4 of FIG. 2;

FIG. 5 is a cross-sectional view as seen from line 5—5 of FIG. 4;

FIG. 6 is a top elevational view of a metal purlin, portions thereof broken away;

FIG. 9 is a perspective view of the metal strip illustrated in FIG. 8, being further bent;

FIG. 10 is a perspective view of slots being cut into the metal strip illustrated in FIG. 9;

FIG. 11 is a side elevational view of the metal strip illustrated in FIG. 10;

3

Figure 13:
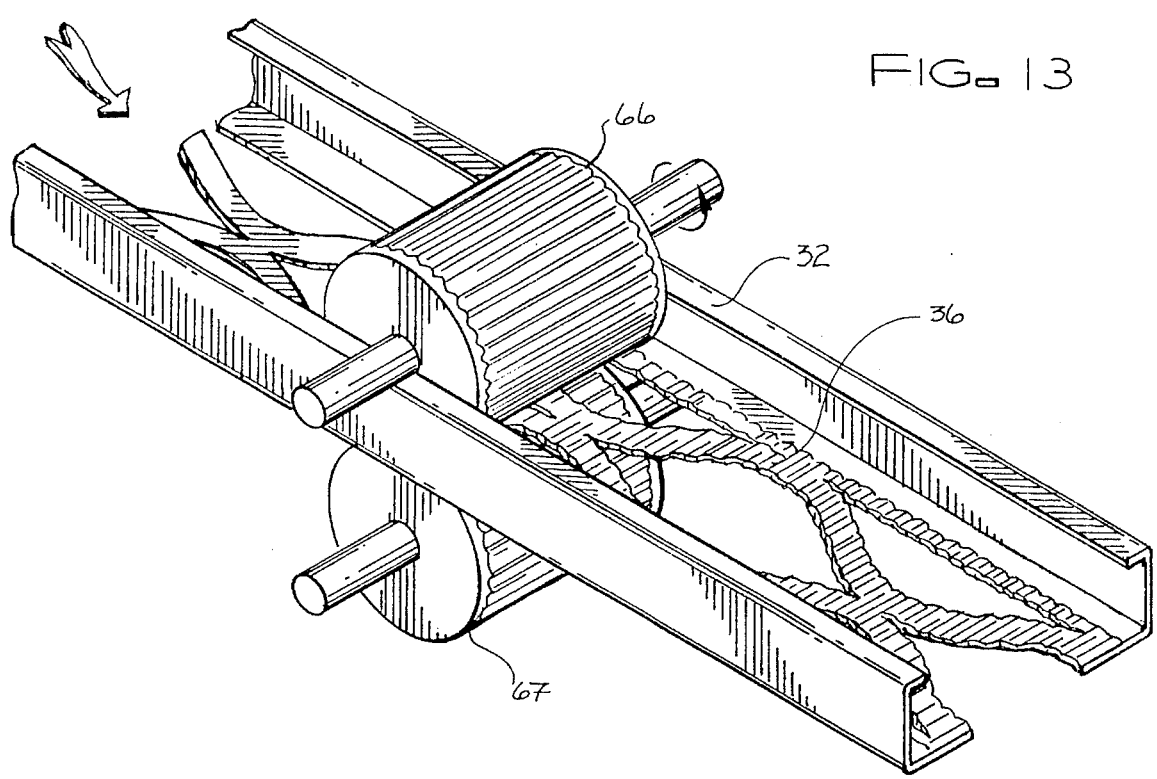
Figure 16:
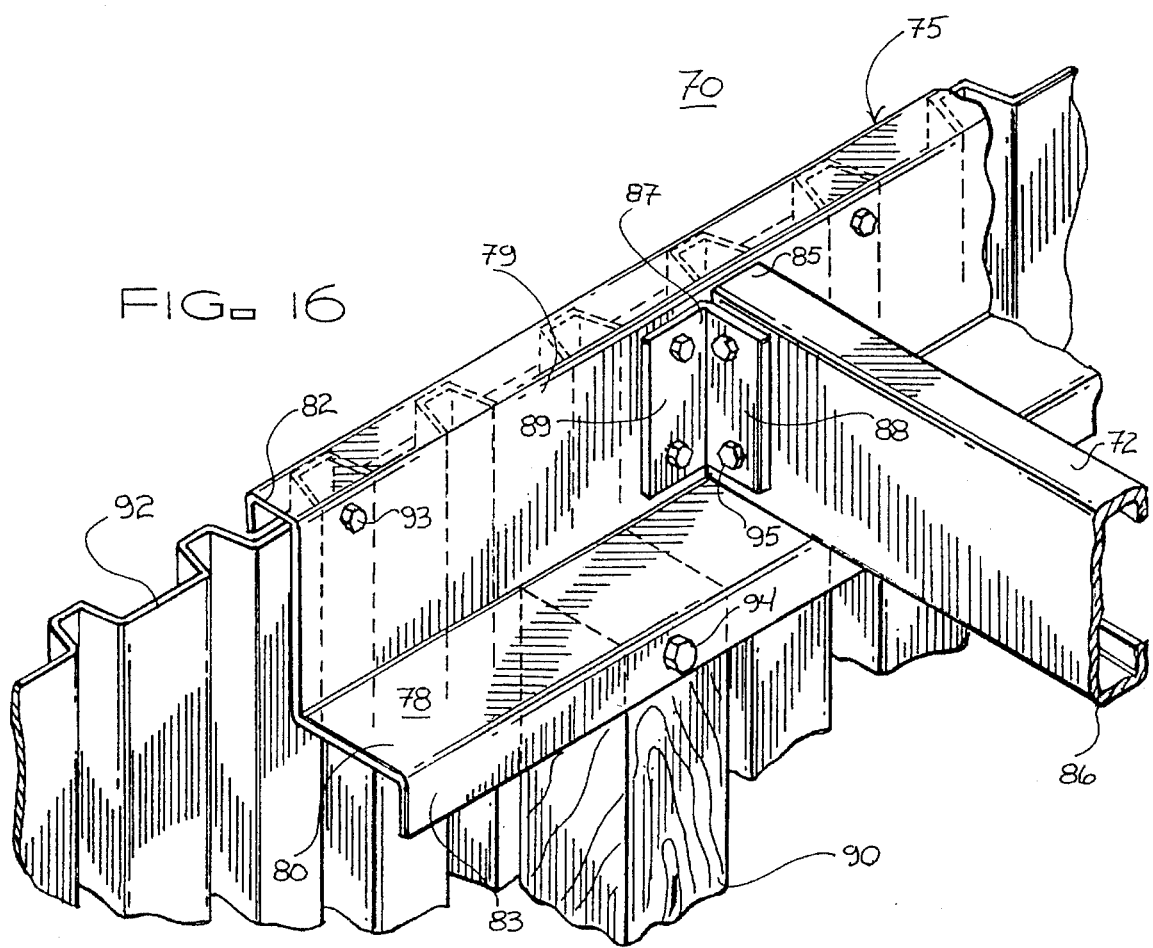

FIG. 12 is a perspective view of the slots in the metal strip, illustrated in FIG. 10, being expanded;

FIG. 13 is a perspective view of the expanded metal strip being corrugated;

FIG. 14 is a side elevational view of the corrugated and expanded metal strip illustrated in FIG. 13;

FIG. 15 is a cross-sectional view as seen from line 15—15 of FIG. 14;

FIG. 16 is an enlarged perspective view of another embodiment of a purlin in accordance with the present invention, portions thereof broken away and shown in section;

FIG. 17 is an exploded perspective view illustrating the relative positions of the various components, portions thereof broken away;

FIG. 18 is a view in top plan of the assembled structure illustrated in FIG. 16, with hidden components illustrated in broken lines to indicate the relative positions; and FIG. 19 is an enlarged sectional view as seen from the line 19—19 of FIG. 18.

DETAILED DESCRIPTION OF THE PREFERRED EMBODIMENT

Turning now to the drawings, in which like reference characters indicate corresponding elements throughout the several views, attention is now directed to FIG. 1 which illustrates a fabricated building 20. Fabricated building 20 includes a pair of sidewalls 22 positioned in an upright and spaced apart relationship, a pair of endwalls 23 and 24 positioned in an upright and spaced apart relationship so as to be affixed to vertical edges of sidewalls 22, and a roof 26 affixed to top edges of sidewalls 22 and endwalls 23 and 24 to form a complete inclosure. In this embodiment sidewalls 22 and endwalls 23 and 24 are fabricated out of corrugate steel, but it should be understood that any ridged sheet material, such as aluminum, fiberglass, or the like may be used. Endwall 23, in this embodiment, has an opening 29 therein for ingress and egress to fabricated building 20, though it should be understood that any of the sidewalls 22 or endwalls 23 and 24 may have openings for access, windows, or the like.

Fabricated building 20 is illustrated in FIG. 2 with roof 26 removed so that a plurality of metal purlins 30 may be illustrated. Metal purlins 30 in fabricated building 20 would be equivalent to rafters or beams in any other type of building. The ends of metal purlins 30 are engaged with upper edges of sidewalls 22 so that the plurality of metal purlins 30 extend between the pair of sidewalls 22 and maintain them in an upright position. In this embodiment, each of the plurality of metal purlins 30 are similar and therefore only one will be discussed in detail.

Metal purlin 30, as illustrated in FIG. 3 and 4, includes an elongated metal channel 32 and a pair of metal hangers 33 affixed to separate ends of elongated metal channel 32. Elongated metal channel 32 is constructed having a C-shaped cross-section 34 with an expanded and corrugate web 36. Each of the metal hangers 33, in this embodiment, are similar and therefore only one will be discussed in detail. Metal hanger 33 includes a vertical metal plate 37, extending downwardly a distance greater than the width of expanded web 36, with an inverted channel 38 integrally formed along an upper edge thereof. Illustrated in FIG. 5, one end of elongated metal channel 32 is affixed to the center of metal plate 37 of metal hanger 33 so that inverted channel 38 extends outwardly from elongated metal channel 32. Inverted channel 38, as illustrated in FIG. 6, engages an upper edge of one of sidewalls 22.

Figure 7:
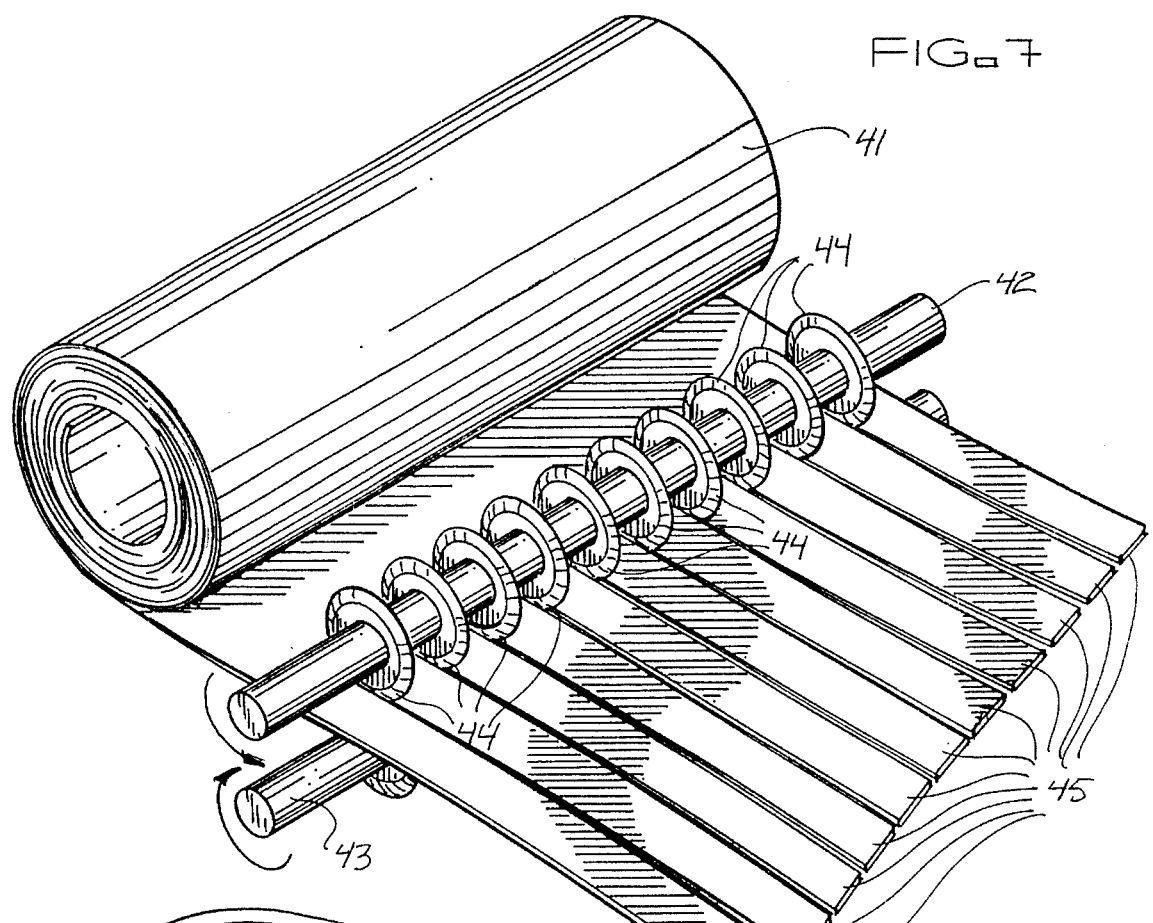
FIG. 7 is a perspective view of a coil of metal being cut into a plurality of metal strips.

A method for fabricating elongated metal channel 32 of metal purlin 30 is illustrated in FIGS. 7–15. A coil of sheet metal 41 is unwound and inserted between a pair of rotating cutting shafts 42 and 43, each having a plurality of spaced apart rotating blades 44, which cut and move sheet metal 41. In this embodiment, as illustrated in FIG. 7, cutting shaft 42 rotates counterclockwise and rests against sheet metal 41. Cutting shaft 43 rotates clockwise and rests against sheet metal 41 on the opposite side from cutting shaft 42. A plurality of elongated metal strips 45 of a predetermined width with longitudinal edges extending the length of sheet metal 45 are produced. Since all of the plurality of metal strips 45 are essentially identical and go through the same fabrication method, only one will be discussed in detail.

Figure 8:
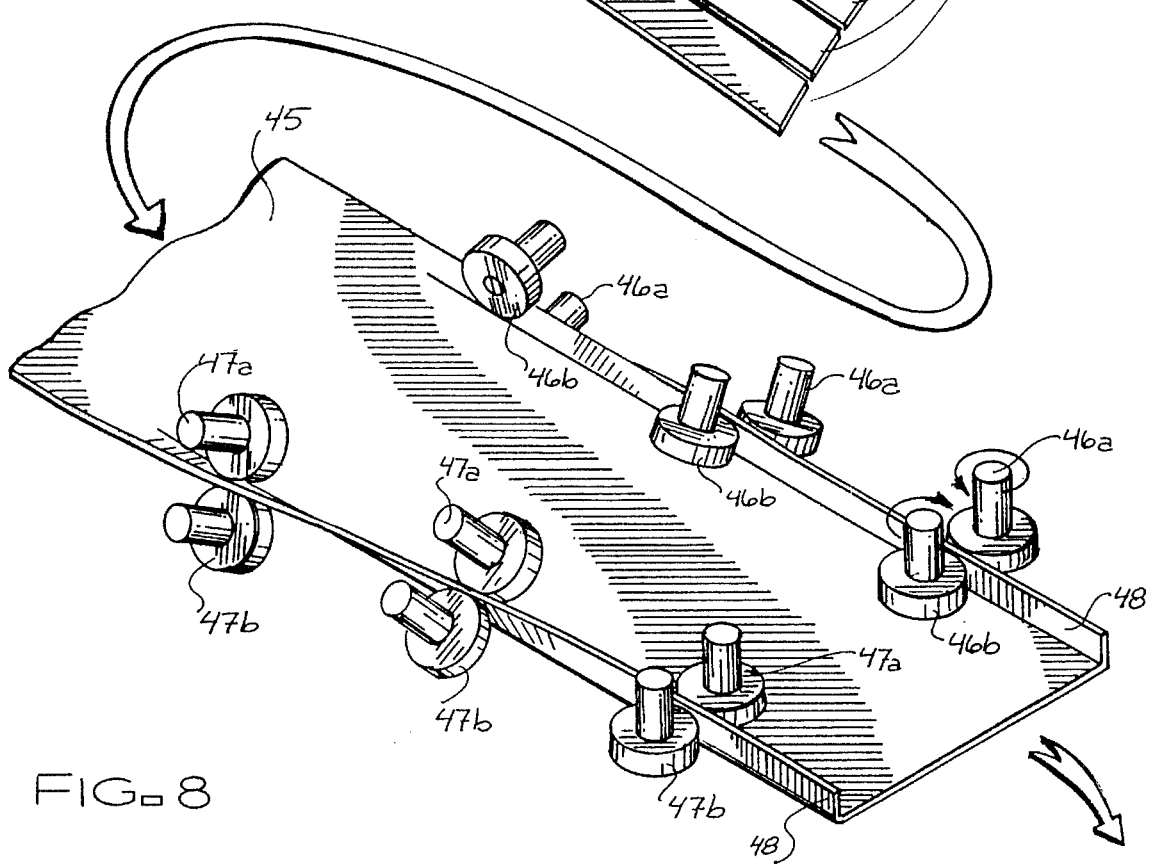
FIG. 8 is a perspective view of a metal strip illustrated in FIG. 7, with the edges thereof being bent into flanges.

It should be noted that all roller segments, illustrated in FIGS. 7–15, consist of a pair of rollers which rotate to facilitate the movement of the piece being fabricated. All rollers designated "a" rotate counterclockwise while all rollers designated "b" rotate clockwise. A plurality of roller segments 46 and 47 are spaced the width of metal strip 45 apart, as illustrated in FIG. 8, with the edges of metal strip 45 engaged in between the rollers of a plurality of roller segments 46 and 47. Each edge of sheet metal 45 is bent upward to form a flange 48 by gradually increasing the angle, from horizontal (parallel to metal strip 45) to vertical (perpendicular to metal strip 45), over the plurality of roller segments 46 and 47. Referring to FIG. 9, metal strip 45 with flanges 48 is inserted in between the rollers of a plurality of roller segments 51 and 52. Metal strip 45 is gradually bent upward to form elongated metal channel 32 having c-shaped cross-section 34 with a substantially flat unexpanded web 36.

Web 36 of elongated metal channel 32 is inserted between a pair of diametrically opposed lancing dies 56 and 57, as illustrated in FIG. 10, with lancing die 56 being male and lancing die 57 being female. In this embodiment, lancing die 56 rotates counterclockwise while lancing die 37 rotates clockwise to facilitate the movement of metal strip 45. A plurality of slots 58, which are longitudinally extending and transversely spaced apart while further being staggered and longitudinally spaced apart, are cut in web 36 by lancing dies 56 and 57. Web 36 with slots 58 is further illustrated in FIG. 11.

Elongated metal channel 32 with web 36 having slots 58 is inserted between the rollers of roller segments 61 and 62 to expand slots 58, as illustrated in FIG. 12. By gradually increasing the distance between roller segments 61 and 62, along a plurality of roller segments 61 and 62, slots 58 are forced to expand. Web 36 is expanded by expanding slots 58.

Expanded web 36 of elongated metal channel 32 is inserted between a pair of diametrically opposite forming dies 66 and 67, as illustrated in FIG. 13, where forming die 66 fits into elongated metal channel 32. Forming die 66 rotates counterclockwise and forming die 67 rotates clockwise corrugating expanded web 36 while moving elongated metal channel 32. Corrugate and expanded web 36 of elongated metal channel 32 is illustrated in FIGS. 14 and 15.

Because of the unique formation of purlins 30 by using less metal, they are more energy efficient and less expensive. These purlins 30 are constructed to be heavy-duty, thereby easily supporting a fabricated building. This makes fabricated building 20 containing purlins 30 inexpensive to construct and to fabricate, easily constructed using a minimum amount of simple tools, and a lightweight yet sturdy construction due to the heavy-duty internal support.

Referring specifically to FIG. 16, another embodiment of a purlin 70 is illustrated in perspective, portions thereof broken away and shown in section. Purlin 70 includes an elongated metal channel 72 having a C-shaped cross-section, and a metal hanger 75 affixed to each end thereof (only one end illustrated). Metal hanger 75 has a metal plate 78 with an L-shaped cross-section including a generally vertical portion 79 and a generally horizontal portion 80. An inverted channel 82 is integrally formed along an upper edge of vertical portion 79 and extends outwardly in a direction opposite to horizontal portion 80. A downwardly extending lip 83 is integrally formed with the outer edge of horizontal portion 80 and extends the length thereof. End 85 of elongated metal channel 72 is positioned in abutting engagement with vertical portion 79 of metal plate 78 and a lower edge 86 of elongated metal channel 72 rests on the upper surface of horizontal portion 80 of metal plate 78. A bracket 87 with an L-shaped cross-section having one arm 88 affixed to elongated metal channel 72 and another arm 89 affixed to vertical portion 79 of metal plate 78 is utilized to rigidly attached metal hanger 75 to elongated metal channel 72. Bracket 87 can be formed of some convenient material, such as angle iron, aluminum angles, etc.

A vertical post 90 is positioned with one vertical side juxtaposed to a metal sidewall 92. Inverted channel 82 is engaged over the upper edge of metal sidewall 92 and the lower surface of horizontal portion 80 of metal plate 78 is positioned to rest on the upper end of vertical post 90 so that lip 83 engages the opposite side of vertical post 90. A plurality of bolts 93, or the like, are utilized to fixedly engage metal hangar 75 with metal sidewall 92, as illustrated in FIG. 7. A bolt 94, or the like is engaged through lip 83 and into vertical post 90 to engage metal hangar 75 fixedly with vertical post 90. End 85 is positioned on horizontal portion 80 of metal plate 78 and bracket 87 is positioned in the corned therebetween and fixedly attached to elongated metal channel 72 and vertical plate 79 by means of bolts 95, or the like, as illustrated in FIGS. 18 and 19.

Thus, in this embodiment, vertical posts 90 are added for additional support and, through the novel design of metal hangars 75 at each end of elongated metal channels 72, metal sidewalls 92, vertical posts 90 and elongated metal channels 72 are fixedly engaged together to produce a solid construction. Further, horizontal portion 80 of metal plate 78 provides a solid platform for elongated metal channels 72 while being supported from below by vertical posts 90. Because of the length of metal hangars 75, there is no need to position elongated metal channels 72 directly over vertical posts 90 and, thus, a wide latitude in the position of various components in the final assembly is possible. While elongated metal channels 72 are illustrated with a solid constructed web in this embodiment, it should be understood that an expanded and corrugated web can be used in this embodiment also.

Various changes and modifications to the embodiment herein chosen for purposes of illustration will readily occur to those skilled in the art. To the extent that such modifications and variations do not depart from the spirit of the invention, they are intended to be included within the scope thereof which is assessed only by a fair interpretation of the following claims.

Having fully described the invention in such clear and concise terms as to enable those skilled in the art to understand and practice the same,

The invention claimed is:

1. A method of fabricating a metal purlin comprising the steps of:

providing a sheet of metal;

cutting the sheet into elongated strips having a predetermined width with longitudinal edges extending the length thereof;

rolling the edges of one of the strips into a channel having a generally C-shaped cross-section with a substantially flat web;

cutting a plurality of longitudinally extending and transversely spaced apart slots in the web, the slots further being staggered and longitudinally spaced apart;

expanding the web of the channel by expanding the width of the slots;

corrugating the expanded web;

providing a pair of second sheets of metal;

rolling one edge of each of the second sheets to form an inverted channel, with one edge of the inverted channel defining a vertical plate having an inner surface and an outer surface, the inner surface facing the inverted channel, the vertical plate extending downwardly a distance greater than the width of the expanded web; and affixing the outer surface of the vertical plate of each of the inverted channels to a respective end of the C-shaped channel.

2. The method as claimed in claim 1 wherein the step of affixing the vertical plate includes welding.

3. The method as claimed in claim 1 wherein the step of expanding the web includes expanding the width of the slots so that the web is expanded to approximately twice an unexpanded width of the web.

4. A method of fabricating a building comprising the steps of:

providing a sheet of metal;

cutting the sheet into elongated strips having a predetermined width with longitudinal edges extending the length thereof;

rolling the edges of one of the strips into a channel having a generally C-shaped cross-section with a substantially flat web;

cutting a plurality of longitudinally extending and transversely spaced apart slots in the web, the slots further being staggered and longitudinally spaced apart;

expanding the web of the channel by expanding the width of the slots;

corrugating the expanded web;

providing a pair of second sheets of metal;

rolling one edge of each of the second sheets to form an inverted channel, with one edge of the inverted channel defining a vertical plate having an inner surface and an outer surface, the inner surface facing the inverted channel, the vertical plate extending downwardly a distance greater than the width of the expanded web;

affixing the outer surface of the vertical plate of each of the inverted channels to a respective end of the C-shaped channel to form a metal purlin;

providing a pair of metal sidewalls and positioning the metal sidewalls in an upright spaced apart relationship; and engaging each inverted channel with an upper edge of a respective one of the metal sidewalls so that the metal purlin extends between the metal sidewalls and maintains them in the upright position.

5. The method as claimed in claim 4 wherein the step of expanding the web includes expanding the width of the slots so that the web is expanded to approximately twice an unexpanded width of the web.

6. The method as claimed in claim 4 wherein the step of affixing the vertical plate includes welding.

7. The method as claimed in claim 4 wherein the step of providing a pair of metal sidewalls includes providing sidewalls which are formed of corrugate metal.

8. The method as claimed in claim 4 further including affixing end walls to vertical edges of the sidewalls to form a complete inclosure.

9. A method of fabricating a metal building comprising the steps of:

providing a metal purlin including the steps of
   providing a sheet of metal,
   cutting the sheet into elongated strips having a predetermined width with longitudinal edges extending the length thereof,
   rolling the edges of one of the strips into a channel having a generally C-shaped cross-section with a substantially flat web,
   cutting a plurality of longitudinally extending and transversely spaced apart slots in the web, the slots further being staggered and longitudinally spaced apart,
   expanding the web of the channel by expanding the width of the slots,
   corrugating the expanded web,
   providing a pair of second sheets of metal,
   rolling one edge of each of the second sheets to form an inverted channel, with one edge of the inverted channel defining a vertical plate having an inner surface and an outer surface, the inner surface facing the inverted channel, the vertical plate extending downwardly a distance greater than the width of the expanded web, and
   affixing the outer surface of the vertical plate of each of the inverted channels to a respective end of the C-shaped metal channel;

providing a pair of metal sidewalls and positioning the metal sidewalls in an upright spaced apart relationship; and engaging each inverted channel with an upper edge of a respective one of the metal sidewalls so that the metal purlin extends between the metal sidewalls and maintains them in the upright position.

* * * * *